(12) United States Patent
Schwartz et al.

(10) Patent No.: US 7,628,842 B2
(45) Date of Patent: Dec. 8, 2009

(54) HYDROGEN PURIFICATION FOR FUEL CELL VEHICLE

(75) Inventors: Joseph Michael Schwartz, Williamsville, NY (US); Raymond Francis Drnevich, Clarence Center, NY (US)

(73) Assignee: Praxair Technology, Inc., Danbury, CT (US)

( * ) Notice: Subject to any disclaimer, the term of this patent is extended or adjusted under 35 U.S.C. 154(b) by 414 days.

(21) Appl. No.: 11/820,096

(22) Filed: Jun. 18, 2007

(65) Prior Publication Data

US 2008/0311443 A1    Dec. 18, 2008

(51) Int. Cl.
*B01D 53/22* (2006.01)
*H01M 8/04* (2006.01)
*H01M 8/06* (2006.01)

(52) U.S. Cl. .................. 95/56; 95/55; 96/4; 96/7; 429/17; 429/19; 429/20; 429/22

(58) Field of Classification Search .......... 95/45, 95/55, 56; 96/4, 7, 8, 10, 417; 429/17, 19, 429/20, 22; 423/579
See application file for complete search history.

(56) References Cited

U.S. PATENT DOCUMENTS

| | | | |
|---|---|---|---|
| 1,174,631 A | | 3/1916 | Snelling |
| 4,078,985 A | | 3/1978 | Takeuchi |
| 5,652,020 A | | 7/1997 | Collins et al. |
| 5,852,925 A | * | 12/1998 | Prasad et al. ............ 95/55 |
| 5,980,609 A | * | 11/1999 | Baker et al. ............. 95/50 |
| 6,348,278 B1 | * | 2/2002 | LaPierre et al. ......... 429/17 |
| 6,350,297 B1 | | 2/2002 | Doyle et al. |
| 6,572,837 B1 | * | 6/2003 | Holland et al. .......... 429/17 |
| 6,953,497 B2 | | 10/2005 | Edlund et al. |
| 7,052,530 B2 | | 5/2006 | Edlund et al. |
| 7,115,236 B2 | | 10/2006 | Sekiba et al. |
| 7,348,083 B2 | * | 3/2008 | Enjoji et al. ............. 429/17 |
| 2004/0031390 A1 | * | 2/2004 | Myasnikov et al. ....... 96/146 |
| 2004/0213712 A1 | * | 10/2004 | Beckmann et al. ...... 429/19 |
| 2006/0019134 A1 | | 1/2006 | Yagi et al. |
| 2007/0031718 A1 | * | 2/2007 | Fujimura et al. ......... 429/17 |
| 2007/0190380 A1 | * | 8/2007 | DeVries .................. 429/19 |
| 2009/0130505 A1 | * | 5/2009 | McElroy .................. 429/17 |

OTHER PUBLICATIONS

Amphlett et al., "On Board Hydrogen Purification for Steam Reformer/PEM Fuel Cell Vehicle Power Plants", Proceedings of the 10th World H2 Energy Conference, Florida (1994).

Lattner et al., "Comparison of Conventional and Membrane Reactor Fuel Processors for Hydrocarbon-based PEM Fuel Cell Systems", 2004, pp. 393-417.

* cited by examiner

*Primary Examiner*—Jason M Greene
(74) *Attorney, Agent, or Firm*—David M. Rosenblum

(57) ABSTRACT

A purification system and method for purifying a hydrogen stream supplied from a storage tank mounted in a vehicle to produce a purified hydrogen stream for use in a PEM fuel cell system that is utilized within the vehicle. The hydrogen is purified within a membrane separator having hydrogen transport membrane elements having a dense metallic layer such as palladium to separate the hydrogen from the impurities. The separated hydrogen is supplied to the PEM fuel cell. In order to heat the membrane to its operational temperature, heat is recovered from the hydrogen permeate stream of the membrane system in a first heat exchanger and heat is generated by combusting the retentate stream containing residual hydrogen and impurities.

10 Claims, 2 Drawing Sheets

HYDROGEN PURIFICATION FOR FUEL CELL VEHICLE

FIELD OF THE INVENTION

The present invention relates to a purification system and method for purifying hydrogen to be consumed within a polymer electrolyte membrane fuel cell mounted in a vehicle for generating electricity to power electrical motors of the vehicle. More particularly, the present invention relates to such a system and method in which the hydrogen is purified with a hydrogen transport membrane utilizing a metal or metal alloy such as palladium.

BACKGROUND

There has been recent interest in powering vehicles with electricity that is created on board by electrochemical reaction of hydrogen and oxygen within a polymer electrolyte membrane to produce water as a by product. In a polymer electrolyte membrane fuel cell, also called a proton exchange membrane, hydrogen is passed on the anode side of the membrane while air, containing the oxygen, is passed on the cathode side of the membrane. At the anode, a platinum catalyst causes the hydrogen to ionize into hydrogen ions or more particularly, protons and electrons. The polymer electrolyte membrane allows only the protons to pass through it to the cathode side where the hydrogen combines with the oxygen to produce the water. The electrons pass from the anode to the cathode through an external circuit that can be connected to an electrical motor to propel the vehicle.

The hydrogen purity requirement for the polymer electrolyte membrane fuel cell is quite stringent because any carbon monoxide, as well as other impurities in the hydrogen, will tend to poison the platinum catalyst used in the fuel cell. In the prior art, it has been proposed to generate the hydrogen on board the vehicle, purify the hydrogen with a palladium based membrane system and then supply the hydrogen, once purified, to the polymer electrolyte fuel cell. An example of such a system can be found in U.S. Pat. No. 6,348,278 in which a fuel is reformed in a reactor and the reformed hydrogen is purified in a downstream palladium based membrane system. The palladium based membrane system is capable of separating the hydrogen when such system is heated to a high operational temperature. However, given that the reformed hydrogen is produced at a high temperature, the reformed hydrogen itself can be used for such heating purposes. The hydrogen permeate is supplied to the fuel cell and part of the retentate is combusted in a reactor utilizing an oxidation catalyst to generate heat that is used in preheating the feed to the reformer.

In other types of systems to be used in connection with vehicles the hydrogen is produced in a large scale steam methane reforming system that produces a synthesis gas that is purified to produce the hydrogen. The hydrogen is then distributed to fueling stations where it is supplied to an on board high pressure tank contained in the vehicle either in a gaseous or liquid form. However, even in such case, high purity hydrogen has to be supplied to an on board high pressure tank contained within the vehicle. As can be appreciated, as the purity of the hydrogen increases, the cost of the hydrogen as a fuel for the vehicle also increases. Moreover, the problem is only exacerbated in that in transporting and charging the vehicle fuel tank with the hydrogen, impurities can be introduced into the hydrogen. This does not allow the use of standard grade hydrogen having a purity of at least about 99.95 percent by volume. Typically, even where high purity hydrogen is used, because such impurities have a higher volatility than the hydrogen, hydrogen vapor containing the impurities is continually being vented from the on board vehicle tank. Hydrogen transport membranes of the type containing palladium are not used for such purification purposes given that there is no readily available heat source contained in the vehicle that can be used for such purposes.

As will be discussed, the present invention allows the use of a hydrogen transport membrane to remove impurities from the hydrogen to be supplied to the fuel cell from a fuel tank mounted in a vehicle and in particular, the use of standard grade hydrogen in the first instance.

SUMMARY OF THE INVENTION

The present invention relates to a purification system for purifying a hydrogen stream supplied from a storage tank mounted in a vehicle to produce a purified hydrogen stream for a PEM fuel cell system utilized within the vehicle. In this regard, the term "PEM fuel cell system" as used herein and in the claims means a fuel cell that employs a fuel cell assembly incorporating a polymer electrolyte membrane that is formed from a polymer, for example, NAFION® membranes by DuPont®. Other examples of membrane materials known in the art are possible such as those based on polybenzimidazole.

In accordance with the present invention a membrane separator is provided that uses a hydrogen transport membrane material containing a metal or metal alloy capable of selectively permeating hydrogen from the hydrogen stream at an elevated membrane operational temperature, thereby to produce a purified hydrogen permeate stream and a retentate stream comprising impurities contained in the hydrogen stream. Such impurities include carbon monoxide that could poison the platinum catalyst used in the PEM fuel cell system. The membrane separator is in flow communication with the storage tank to receive the hydrogen stream and also in flow communication with the PEM fuel cell system to form the purified hydrogen stream from the purified hydrogen permeate stream produced in the membrane separator. A pressure regulator is located between the storage tank and membrane separator and is configured to control pressure of the hydrogen stream to a membrane separator operational pressure.

A combustor is connected to the membrane separator and configured to combust the retentate stream to produce a heated exhaust stream. First and second heat exchangers are located between the pressure regulator and the membrane separator to exchange heat from the purified hydrogen permeate stream and from the heated exhaust stream to the hydrogen stream to heat the hydrogen stream and therefore the hydrogen transport membrane material to the elevated membrane operational temperature. The first and second heat exchangers are connected to the membrane separator and the combustor, respectively, such that the purified hydrogen permeate stream indirectly exchanges heat to the hydrogen stream and the heated exhaust stream indirectly exchanges further heat to the hydrogen stream. A control valve is interposed within the first heat exchanger and the PEM fuel cell and is configured to control pressure of the purified hydrogen stream to a PEM fuel cell operational pressure.

The purified hydrogen stream can be directly formed from the hydrogen permeate stream. However, an accumulator tank can be located between the first heat exchanger and the control valve such that the purified hydrogen permeate stream accumulates within the accumulator tank and the purified hydrogen stream is supplied from the accumulator tank to the PEM fuel cell system. The control valve in such case is also configured to control flow rate of the purified hydrogen stream.

Preferably, the combustor has an oxidation catalyst to facilitate the combustion of the retentate stream. In any embodiment of the present invention, the metal can be palladium or the metal alloy can contain palladium.

In another aspect, the present invention provides a method of purifying a hydrogen stream supplied from a storage tank mounted in a vehicle to produce a purified hydrogen stream for a PEM fuel cell system utilized within the vehicle for generating electricity. In accordance with the method impurities contained in the hydrogen stream are separated by permeating hydrogen from the hydrogen stream through a membrane separator utilizing a hydrogen transport membrane material. The hydrogen transport membrane material contains a metal or metal alloy capable of selectively permeating hydrogen from the hydrogen stream at an elevated operational membrane temperature. This produces a purified hydrogen permeate stream and a retentate comprising impurities contained in the hydrogen stream. The purified hydrogen stream is formed from the purified hydrogen permeate stream and the purified hydrogen stream is supplied to the PEM fuel cell system. Pressure within the hydrogen stream is regulated to a membrane operational pressure.

The retentate stream is combusted to produce a heated exhaust stream. Heat is exchanged from the purified hydrogen permeate stream and from the heated exhaust stream to the hydrogen stream to heat the hydrogen stream and therefore the hydrogen transport membrane material to the elevated membrane operational temperature. The pressure of the purified hydrogen stream is controlled to a PEM fuel cell operational pressure prior to supplying the purified hydrogen stream thereto.

The purified hydrogen stream can be directly formed from the purified hydrogen permeate stream. Alternatively, the purified hydrogen permeate stream can be accumulated in an accumulator tank and the purified hydrogen stream can be supplied from the accumulator tank to the PEM fuel cell system. In such case the flow rate of the purified hydrogen stream is also controlled. Moreover, the combustion of the retentate stream can be facilitated by an oxidation catalyst. In any embodiment, the metal can be palladium or the metal alloy can contain palladium.

As can be appreciated from the above description, the present invention allows heat to be generated on board to heat the hydrogen transport membrane to its operational temperature so that it can be used to purify hydrogen in connection with the use of hydrogen supplied by a vehicle fuel tank.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
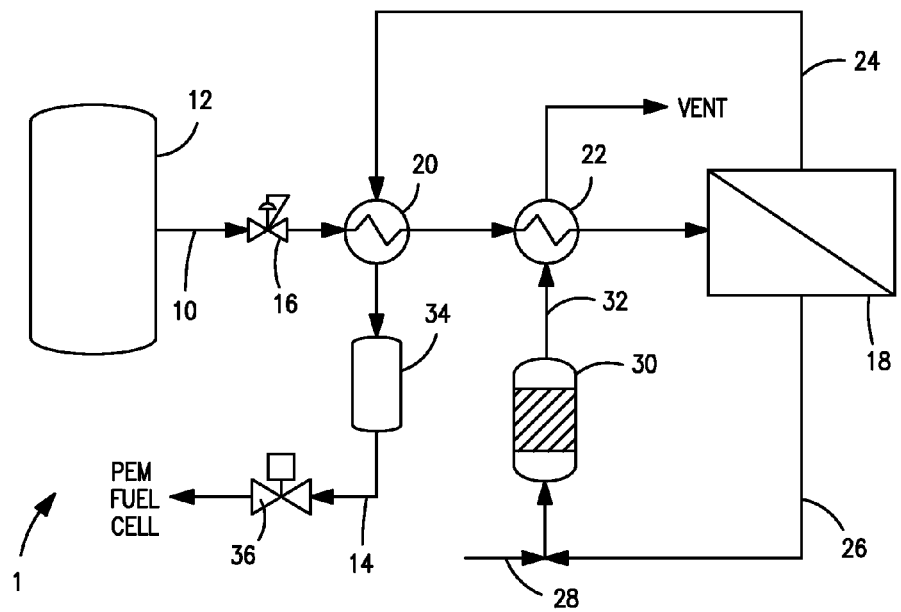
FIG. 1 is a schematic, process flow diagram of an apparatus for carrying out a method in accordance with the present invention.

With reference to FIG. 1 a purification system 1 is illustrated for purifying a hydrogen stream 10 supplied from a storage tank 12 mounted in a vehicle (not illustrated) to produce a purified hydrogen stream 14 for a PEM fuel cell system utilized within the vehicle.

As indicated above, the hydrogen contained within storage tank 12 can be standard grade hydrogen that has a purity of at least about 99.95 percent by volume and contains such impurities as carbon monoxide. Typically it is stored at 20 MPa (3,000 psia) or greater. Hydrogen storage tank 12 can be of known construction utilizing fiberglass and carbon fibers for reinforcement.

Hydrogen stream 10 passes through a pressure regulation valve 16 to control the pressure of hydrogen stream 10 to an operational pressure of a membrane separator 18 that will be discussed in more detail hereinafter. Also as will be discussed, membrane separator 18 has an operational temperature at which the hydrogen transport membrane or membranes contained therein function. As such, hydrogen stream 10 is also heated in first and second heat exchangers 20 and 22 to the operational temperature of the membranes contained within membrane separator 18. Hydrogen stream 10, thus heated, thereby heats the membranes. The hydrogen is selectively permeated through the membranes within membrane separator 18 to produce a purified hydrogen permeate stream 24 and a retentate stream 26. The membranes contained within membrane separator 18 have an infinite selectivity to hydrogen and as such, purified hydrogen permeate stream 24 is essentially pure hydrogen whereas retentate stream 26 contains some residual hydrogen not separated by the membranes within membrane separator 18 and the impurities.

In order to save fabrication costs for the first heat exchanger 20, it is preferable to design it with a temperature difference between heated and cooled streams of about 38° C. (100° F.). A closer approach temperature is possible but would increase the heat exchanger required and therefore its cost and size requirements given the limited space of a vehicle. The first heat exchanger 20 is recuperative and the second heat exchanger 22 heats the hydrogen stream 10 to the operational temperature of the membrane separator 18. It does so by combusting the retentate stream 26 preferably in the presence of oxygen provided by an air stream 28 in a combustor 30 to produce an exhaust stream 32 that passes through heat exchanger 22 and indirectly exchanges heat with hydrogen stream 10. Preferably, combustor 30 is provided with a known oxidation catalyst to facilitate the reaction of the oxygen and the combustibles within retentate stream 26 at ambient temperature. The lower temperature combustion helps to eliminate NOx formation.

As can be appreciated, it is preferable that retentate stream 26 be reduced further in pressure to avoid the expense in fabricating combustor 30 and second heat exchanger 22. Thus, although not illustrated, a valve could be provided for such purposes or alternatively, the pressure could be recovered in an expansion turbine with the performance of work that could be applied to an electrical generator.

Purified hydrogen permeate stream 24 after having indirectly exchanged heat with hydrogen stream 10 is then introduced into an accumulation tank 34 from which the purified hydrogen stream 14 may be drawn. As can be appreciated, for start up of a hybrid vehicle, the batteries would contain sufficient power to propel the vehicle. For non-hybrid vehicles, the accumulation tank 34 would contain sufficient hydrogen for start up although electric heat could also be utilized for such purposes. This would be undesirable in that electricity would not be used for motive purposes. Preferably, a valve 36 is provided to control the flow of the purified hydrogen stream 14 to the PEM fuel cell. Valve 36 not only controls the flow but also the pressure of the stream to an operational pressure of the PEM fuel cell. It is further to be noted that another advantage of accumulator tank 34 is that it can be used not only during start up but also during periods of rapid acceleration of the vehicle. It is to be appreciated that in case of non-hybrid vehicles, accumulation tank 34 could be eliminated and thus, valve 36 would only be used to control the pressure.

As has been stated above, in existing PEM fuel cell system designs, about 1 percent of the hydrogen fed to the fuel cell is vented to eliminate impurities and inerts in the feed stream. In the present invention, burning the residual hydrogen in the permeate stream 26, preferably about 1 percent, provides the necessary heat to heat hydrogen stream 10 and therefore the hydrogen transport membranes to their operational temperature and to sustain such operational temperature.

Figure 2:
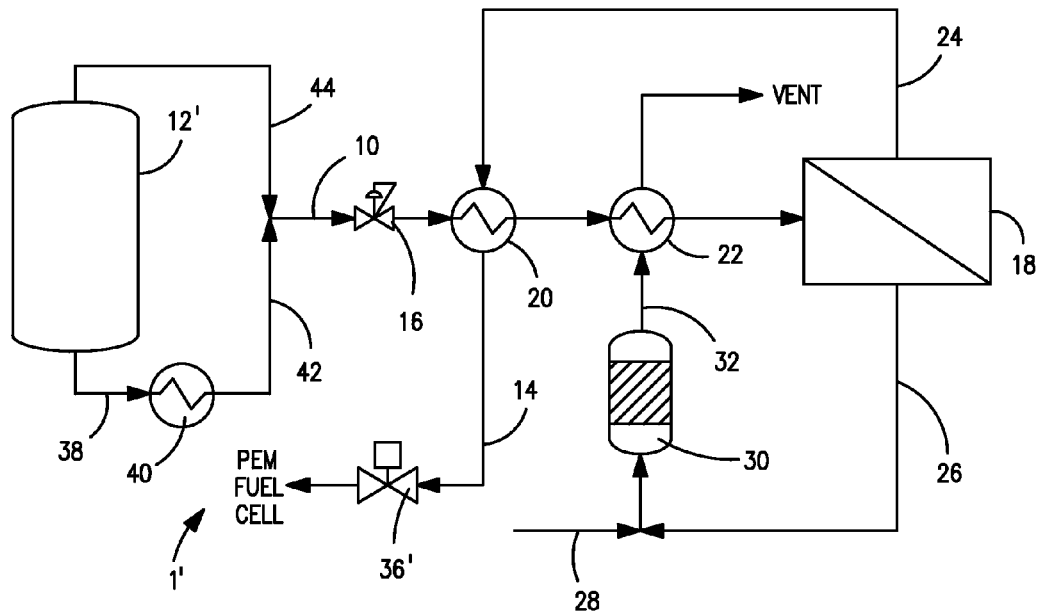
FIG. 2 is an alternative embodiment of FIG. 1.

With reference to FIG. 2, purification system 1' is illustrated in which a hydrogen storage tank 12' is utilized that contains the hydrogen in liquid form. As such, a liquid hydrogen stream 38 is vaporized within an ambient vaporizer 40 to produce a vaporized hydrogen stream 42 that is combined with a hydrogen vapor stream 44 composed of hydrogen that is vaporized within hydrogen storage tank 12' to produce the hydrogen stream 10 to be purified. Hydrogen purification system 1' otherwise operates in the manner of hydrogen purification system 1. In the particular embodiment illustrated, hydrogen purification system 1' is designed to be used in connection with a hybrid vehicle and as such, accumulation tank 34 has been deleted and valve 36' simply acts to adjust the pressure of the purified hydrogen stream 14 that is produced directly from purified hydrogen permeate stream 24 after having passed through first heat exchanger 20.

Figure 3:
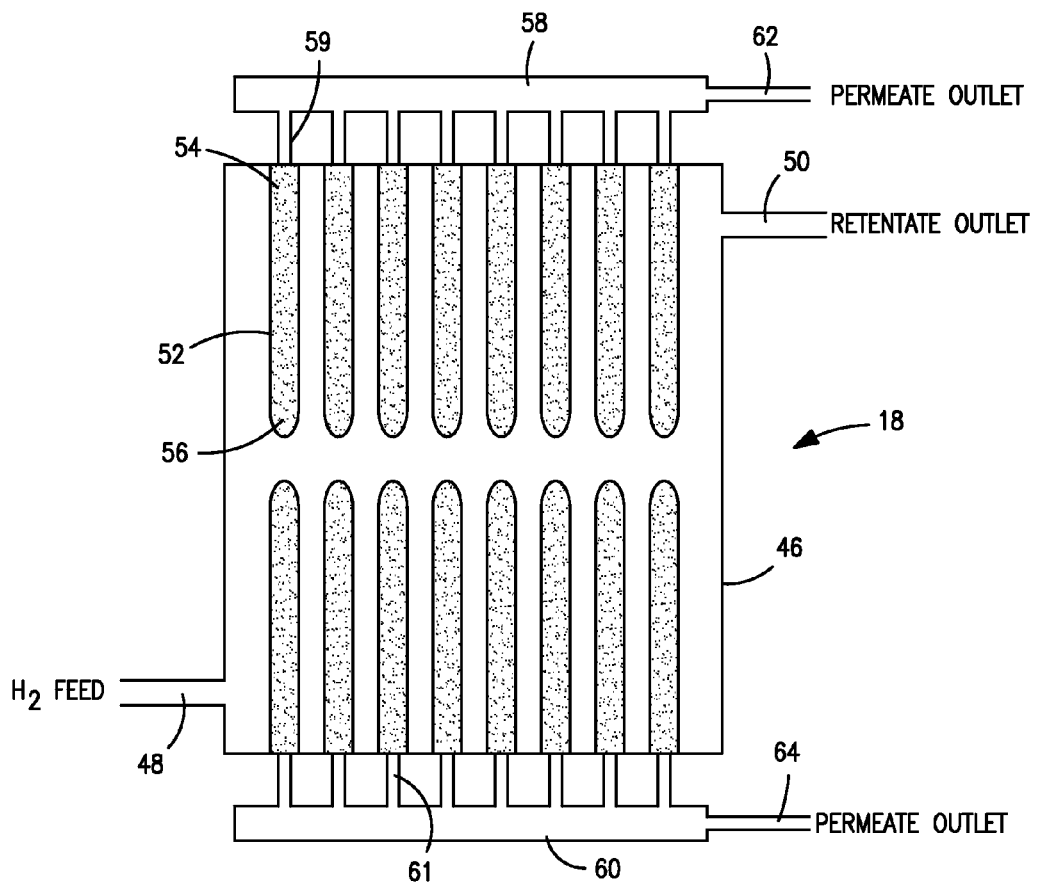
FIG. 3 is a sectional schematic view of a membrane separator shown in FIGS. 1 and 2.

With reference to FIG. 3, membrane separator 18 is illustrated in detail. Membrane separator 18 is provided with a vessel 46 having an inlet 48 that is connected to second heat exchanger 22 and an outlet 50 that is in flow communication with combustor 30 to discharge retentate stream 26 to combustor 30. Contained within vessel 30 are a plurality of hydrogen transport membrane elements 52 in the form of tubes, each having an open end 54 and a closed end 56. At the open end 54 of each of the hydrogen transport membrane elements 52, the hydrogen transport membrane elements 52 are connected to the vessel 46 by welding. Each of the hydrogen transport membrane elements 52 has a dense layer that is formed from palladium or palladium alloy. Niobium and tantalum are also possible as well as other known metals and metal alloys that at an elevated operational temperature and at an operational pressure are capable of permeating protons from a hydrogen containing stream. Although two banks of hydrogen transport membrane elements 52 are shown, embodiments of the present invention is possible in which only one such banks of hydrogen transport membrane elements 52 are used. The examples set forth below are based upon such an embodiment.

The hydrogen stream enters into inlet 48 and the hydrogen is transported through each of the hydrogen transport membrane elements 52 to interior regions thereof. The resultant permeate is discharged to manifolds 58 and 60 having conduits 59 and 61 in registry with openings provided within vessel 18 that communicate with the interior of hydrogen transport membrane elements 52. The purified hydrogen is then discharged through outlets 62 and 64 of manifolds 58 and 60, respectively. Although not illustrated, outlets 62 and 64 would be connected to discharge the purified hydrogen permeate stream 24 to first heat exchanger 20.

It is preferred that the hydrogen transport membrane element 52 be designed and selected so that it performs well at low temperature. Two important issues at low temperature are that hydrogen dissociation on the membrane surface becomes slow and that the membrane alloy itself can undergo a phase transition from a hydrogen conductor to a material with very low hydrogen permeability. The hydrogen dissociation rate can be increased by increasing the membrane surface area or adding a catalyst to increase the dissociation rate.

Although not illustrated, tube isolation devices can be applied to each of the hydrogen transport membrane elements 52 to protect the PEM fuel cell in the event of membrane failure. An excess flow valve or reverse check valve could be used. Failure could be detected either by excess pressure or excess flow. Upon failure of one of the hydrogen transport membrane elements 52, the tube isolation device for the failed element would isolate the element and could simultaneously send a warning signal to the driver by making an electrical contact. This would reduce the amount of fuel available, but still allow the driver to get to a safe location. Vibration is another important consideration, especially when using ceramic substrates for the membranes. Although not illustrated, membrane separator 18 could be isolated from typical road vibrations by, for example, immersing membrane separator 18 in an oil bath.

Each of the hydrogen transport membrane elements 52 is a composite element that is provided with a dense layer containing the hydrogen transport membrane material, e.g. palladium or a palladium alloy, supported on a porous ceramic support that is preferably a ceramic tube that is formed in the following manner. The ceramic tube can be made of zirconium oxide containing about 8 mole percent [8 m %] yttrium oxide. Such powder is available from a wide variety of sources and preferably has a mean particle diameter of about 0.5 micrometers. The powder can be spray granulated after adding 5 weight percent of a binder such as poly vinyl alcohol. The granulated powder such as described above can have a granule size distribution as follows. About 8 wt % are finer than about 10 microns, about 20.2 percent are finer than about 50 microns and about 95 percent are finer than about 28 microns. This mixture of granules flows very easily and is considered desirable for isostatic compaction to yield long, thin walled, about 1 mm thick, tubular structures. The granules can be screened through a 200 mesh screen to eliminate large clumps formed in storage and then the granules are mixed with a fugitive pore former. The preferred pore former is zinc stearate having a mean particle size of about 15 microns. The granules and the pore former can be blended in a ratio of about 88/12 by weight and mixed in a NALGENE jar for 24 hours.

After mixing, the powder is fed into an annular space between a steel core or mandrel and a polyurethane tube. The powder, core, and polyurethane tube assembly is covered with a polyurethane cap and submerged in a water filled tank of an isostatic press. The water is pressurized to yield a pressure of between about 275 MPa on the tube. After compaction the pressure is released and the mold is separated from the green ceramic tube.

The green ceramic tube is placed in a furnace for sintering. The tube is heated in air to about 450° C. at a rate of about 1° C./min. The temperature is maintained at about 450° C. for about 4 hours. The tube is then further heated to about 1450° C. at the same rate and held at that temperature for 4 hours. Subsequently the tube is cooled to room temperature and removed from the furnace. At this point the tube will have shrunk and a porous microstructure is produced having a pore size will be produced ranging from between about 10 microns and about 50 microns and a porosity of about 40 percent by volume. The mandrel and tube size of the isostatic press mold is preferably selected to produce a 1 mm wall thickness of the now sintered ceramic tube.

An outer porous layer can then be applied to the sintered ceramic tube formed in the manner described above with the use of a colloidal suspension of zirconia. The colloidal suspension can be made by ball milling a mixture containing about 280 gm of ceramic powder (as described above), about 80 gm of a binder obtained from The Ferro Corporation of Cleveland, Ohio, United States of America and sold as "FERRO B 73210" binder and about 400 gm of liquid medium, for example toluene. The powders are ball milled with zirconia beads having a diameter of about 1.5 mm to aid the mixing, for 24 hours. The suspension is poured into a long cylindrical tube and allowed to stand for no less than about 10 minutes to allow larger particles to settle out. The closed end of the tube formed in the manner outlined above is then dipped into the colloidal suspension to the desired depth and the tube is then retracted out of the cylindrical container. The tube is allowed to dry for at least about 10 minutes. It is then dipped as before until the colloidal layer built up to about 0.12 to about 0.16 gm per linear centimeter of tube length for a tube of the aforementioned diameter.

The tube after having been dipped to form the outer porous layer is again sintered in a furnace in air. The sintering schedule is the same as for as that used to sinter the green ceramic tube that is outlined above except that the maximum temperature is 1150° C. After the tube is cooled it should be inspected and absent any major defects, it is ready for the next stage of processing. The outer layer formed after sintering has much finer pores than those of the underlying layer and such pores range from about 10 nanometers to about 100 nanometers and exhibit a porosity of 60 percent by volume. The outer layer has a thickness of about 3 microns after such processing.

The dense layer of the hydrogen transport material is applied to the ceramic support in the following manner. As a first step, the ceramic support is cleaned by circulating a 0.1 N sodium hydroxide through the support tube for 15 minutes followed by circulating a 0.1 N hydrochloric acid solution through the ceramic support 10 for 15 minutes and then circulating deionized water through the ceramic support 10 for 15 minutes. About 250 ml of each solution was used for each component and the circulation rate was approximately 50 ml/min. This cleaned the ceramic support of contaminants that were introduced as a result of the successive firings. The support is then sensitized using a 1 g/l solution of tin chloride in a 0.2 N hydrochloric acid and activated using 0.09 g/l solution of palladium chloride in 0.2 N hydrochloric acid. For the sensitization and activation process, the sensitization solution is first circulated through the support tube for about 5 minutes, followed by circulation of the activation solution for about 5 minutes and then circulation of deionized water for about 1 minute. The sensitization/activation process is repeated 4 times. The ceramic support 10 is then dried in an oven at 120° C. for two hours.

Once the external surface of ceramic support was sensitized and activated, the inside of ceramic support is filled with a solution of hydrazine of about 10 mL/L. The hydrazine acts as a precipitating agent. Once the hydrazine appears at the outer surface of the ceramic support, without coating the surface, the ceramic support is immersed in a bath containing about 5.4 g/L of palladium chloride, 390 ml/l of a 5N ammonium hydroxide solution, and about 40 g/l of ethylene diamine tetraacetic acid ("EDTA"). The plating process is then allowed to continue for 60 minutes. In such plating process, the hydrazine flows outward through the pores at the outer surface of the ceramic support and emerges on the outer surface thereof. There it encounters the salt solution and the two react to deposit palladium on the outer surface of the ceramic support so that the palladium bridges the second set of pores without penetrating the same and thus forms the isolated deposits. This is aided by the surface tension of the hydrazine solution which helps form the thin sheet-like deposits on the surface. The process continues until the palladium deposits have bridged the pores. Contact between the hydrazine and the salt solution is now broken and the reaction ceases.

The ceramic support with the thin deposits of palladium can then be removed from the salt solution and the hydrazine solution poured out of ceramic support. After the drying, the ceramic support can then be checked for leaks with pressurized air. If the ceramic support is not leak tight, the process as aforesaid can be repeated.

The ceramic support with the surface deposits of palladium is now ready for deposition of more silver and palladium as needed to obtain the desired thickness of a dense layer to be formed on the outside of the tube to act as the hydrogen transport membrane for separation of the hydrogen from the hydrogen stream.

A single plating operation can be conducted in less than 1 hour to obtain an initial palladium layer of approximately 0.5 microns thickness. This is done by preparing a standard electroless plating bath composition that consists of about 5.4 g/l of palladium chloride, about 390 ml/l of 5N ammonium hydroxide solution, about 40 g/l of ethylene diamine tetraacetic acid, and about 10 ml/l of 1M hydrazine solution. About 185 ml of the bath composition is prepared for a single plating of palladium on ceramic support. All components are mixed together first, except for the hydrazine, which was added just before starting the circulation of the plating solution. The plating bath solution is circulated at a rate of approximately 50 cc/min. The corresponding velocity of the solution in the ceramic support is about 2 cm/sec. The circulation is continued for 1.5 hours at ambient temperature of about 22° C. The support is then rinsed by circulating deionized water for 10 minutes, dried in an oven at 120° C. for two hours. A uniform palladium deposition will have a thickness of about 1 micron. Once the palladium layer is confirmed to be dense, a successive layer of silver can be deposited on the palladium layer having a thickness of about 1 micron. The silver layer in turn can be covered with another layer of palladium having a thickness of about 2 microns. The foregoing is repeated until the resultant layers have a thickness of between about 5 and about 20 microns. The amount of silver and palladium deposited is such that the final separation layer has about 25 wt % of silver in the film. After the deposition process was completed, the tube can be annealed at 650° C. in a nitrogen atmosphere to form a silver palladium alloy. The nitrogen atmosphere had a pressure ranging from between about 108 kPa to about 136 kPa (1 to about 5 psig).

Figure 4:
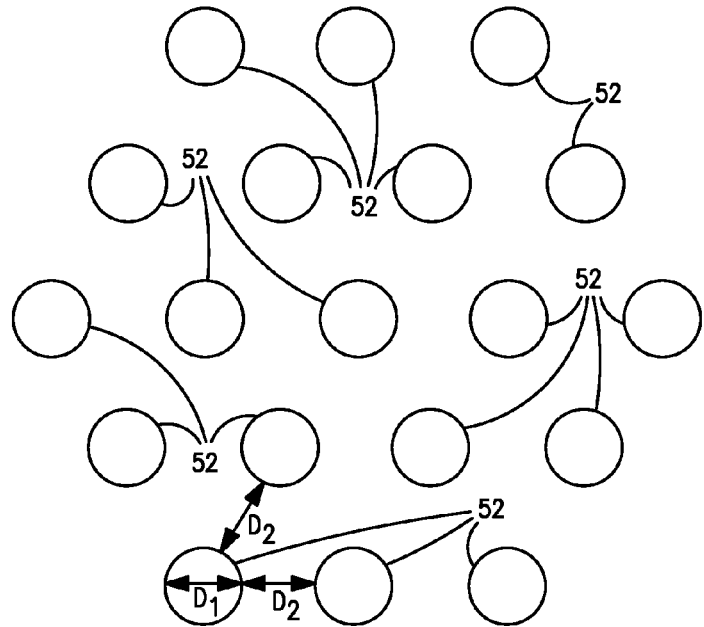
FIG. 4 is a schematic sectional view of FIG. 3 showing the arrangement of hydrogen transport membrane elements utilized in the membrane separator shown in FIG. 3.

The following is a calculated example of the operation of the purification system 1 illustrated in FIG. 1 applied to a hybrid vehicle. As such accumulation tank 34 is not used. Additionally, only one bank of nineteen of the hydrogen transport membrane elements was used in this example having a placement illustrated in FIG. 4. The calculations are based upon membranes such as membrane hydrogen transport membrane elements incorporating a dense layer formed from an alloy containing about 75 percent palladium and about 25 percent silver. The dense layer is between about 5 and about 20 microns thick and supported on a porous ceramic support. The hydrogen transport membrane elements 52 used in the examples below were fabricated in the manner set forth above to produce tubes having a length of about 23.7 cm (9.34 inches) long and with an outer diameter of about 1.3 cm (0.5 inches). As indicated above, only a single bank of nineteen of such hydrogen transport membrane elements were used and as shown FIG. 4, each of the hydrogen transport membrane elements has an inner diameter "D1" of about 1.1 cm (0.42 inches) and a spacing "D2" of about 1.3 cm (0.5 inches). The hydrogen transport membrane elements can be housed within a vessel of cylindrical configuration that has a diameter of about 15.2 cm (6.0 inches) and a height of about 30.5 cm (12 inches).

Table 1, set forth below, contains tabulated potential operating conditions of the purification system of FIG. 1 applied to a hybrid vehicle. As such, accumulation tank 34 is not used. Table 2 is a calculated example of the condition of the streams illustrated in FIG. 1.

TABLE 1

| Parameter | Value |
| --- | --- |
| Membrane Temperature ° C. (° F.) | 260 (500) |
| Membrane Supply Pressure MPa (psig) | 1.48 (200) |
| Permeate Pressure kPa (psig) | 170 (10) |
| Membrane Flux sccm/cm$^2$ (scfh/ft$^2$) | 108.9 (214.4) |
| Vehicle Fuel Efficiency km/kg (miles/kg) | 113 (70) |
| Vehicle Speed km/hr (MPH) | 113 (70) |
| Permeate Flow Rate (kg/hr) | 1 |
| Membrane Area Required m$^2$ (ft$^2$) | 0.18 (1.94) |

The resultant membrane area was estimated on the basis that the fuel consumption will usually be less than 1 kg/hr, given that the vehicle would not always be traveling at 113 km/hr (70 miles per hour).

TABLE 2

| Stream | Pressure MPa (psig) | Temperature C. (F.) | Hydrogen Purity | Co Concen. (ppm) | Flow (kg/hr) |
| --- | --- | --- | --- | --- | --- |
| 10 | 20.8 (3000) | 15.6 (60) | *standard grade | 10 | 1.01 |
| 10 (after valve 16) | 1.49 (202) | 15.6 (60) | standard grade | 10 | 1.01 |
| 10 (after first heat exchanger 20) | 1.49 (201) | 204 (400) | standard grade | 10 | 1.01 |
| 10 (after second heat exchanger 22) | 1.48 (200) | 260 (500) | standard grade | 10 | 1.01 |
| 24 | 0.17 (10) | 260 (500) | **PEM fuel cell grade | <0.1 | 1 |
| 26 | 0.17 (10) | 260 (500) | low | 1000 | 0.01 |
| 24 (after second heat exchanger 22) | 0.17 (10) | 71 (160) | PEM fuel cell grade | <0.1 | 1 |

*Note - Standard Grade Crude Hydrogen has a purity of 99.95% by volume
Note - PEM Fuel Cell Grade has a purity of 99.99% by volume Table 3 illustrates a calculated example of the ranges of operation of the hydrogen supply system of FIG. 1**

TABLE 3

| | Typical Operating Conditions | | | | |
| --- | --- | --- | --- | --- | --- |
| Stream | Pressure MPa (psig) | Temperature C. (F.) | Hydrogen Purity | CO Concen. (ppm) | Flow (kg/hr) |
| 10 | 1.49-69 (201-10,000) | 10-49 (50-120) | standard grade | 10 | 1.01 |
| 10 (after valve 16) | 1.49-1.94 (201-266) | 10-49 (50-120) | standard grade | 10 | 1.01 |
| 10 (after first heat exchanger 20 | 1.49-1.94 (201-266) | 204 (400) | standard grade | 10 | 1.01 |
| 10 (after second heat exchanger 22) | 1.48-1.93 (200-265) | 260 (500) | standard grade | 10 | 1.01 |
| 24 | 0.17-0.34 (10-35) | 260 (500) | PEM fuel cell grade | <0.1 | 1 |
| 26 | 0.17-0.34 (10-35) | 260 (500) | low | 1000 | 0.01 |
| 24 (after second heat exchanger 22) | 0.17-0.34 (10-35) | 10-104 (50-220) | PEM fuel cell grade | <0.1 | 1 |

As indicated in Table 3, the pressure of hydrogen stream 10 as supplied to membrane separator 18 will range from between about 1.48 MPa and about 1.94 MPa (200 psig and about 265 psig). 1.48 MPa (200 psig) represents the case of Table 2 in which there is no accumulation tank 34 such as in a hybrid vehicle. In a non-hybrid vehicle in which accumulation tank 34 would be used, accumulation tank will operate at a pressure higher than 0.17 MPa (10 psig). As a result, the membrane permeate pressure will need to be higher, and consequently, the membrane supply pressure will also need to be increased. In addition, it is known to operate a PEM fuel cell at a higher pressure to obtain more power by virtue of a higher driving force. These fuel cells operate at elevated pressure, about 0.31 MPa (30 psig). Feed air to the fuel cell is compressed to match the hydrogen supply pressure. Increasing the pressure in the fuel cell improves its efficiency at the expense of adding air compression and a decrease in hydrogen storage capacity. For example, purified hydrogen permeate stream 24 would need to be supplied at higher pressure, about 0.34 MPa (35 psig). To maintain the same hydrogen flux with a permeate pressure of 0.34 MPa (35 psig) instead of 0.17 MPa (10 psig) using the conditions of Example 1, the membrane supply pressure would need to be increased from 1.48 MPa (200 psig) to 1.93 MPa (265 psig). In both cases, maintaining the supply pressure of hydrogen stream 10 to membrane separator 18, represents a loss in the amount of usable hydrogen contained within storage tank 12.

While the specification has been described with reference to a preferred embodiment as could be appreciated by those skilled in the art, numerous changes and additions and omissions can be made without departing from the spirit and the scope of the present invention as set forth in the presently pending claims.

We claim:

1. A purification system for purifying a hydrogen stream supplied from a storage tank mounted in a vehicle to produce a purified hydrogen stream for a PEM fuel cell system utilized within the vehicle, said system comprising:
   a membrane separator utilizing a hydrogen transport membrane material containing a metal or metal alloy capable of selectively permeating hydrogen from the hydrogen stream at an elevated membrane operational temperature, thereby to produce a purified hydrogen permeate stream and a retentate stream comprising impurities contained in the hydrogen stream;
   the membrane separator in flow communication with the storage tank to receive the hydrogen stream and in flow communication with the PEM fuel cell system to form the purified hydrogen stream from the purified hydrogen permeate stream produced in the membrane separator;
   a pressure regulator located between the storage tank and the membrane separator and configured to control pressure of the hydrogen stream to a membrane separator operational pressure;
   a combustor connected to the membrane separator and configured to combust the retentate stream to produce a heated exhaust stream;
   first and second heat exchangers located between the pressure regulator and the membrane separator to transfer heat from the purified hydrogen permeate stream and from the heated exhaust stream to the hydrogen stream to heat the hydrogen stream and therefore the hydrogen transport membrane material to the elevated membrane operational temperature;
   the first and second heat exchangers connected to the membrane separator and the combustor, respectively, such that the purified hydrogen permeate stream indirectly exchanges heat to the hydrogen stream and the heated exhaust stream indirectly exchanges further heat to the hydrogen stream; and
   a control valve interposed between the first heat exchanger and the PEM fuel cell and configured to control pressure of the purified hydrogen stream to a PEM fuel cell operational pressure.

2. The purification system of claim 1, wherein the purified hydrogen stream is directly formed from the purified hydrogen permeate stream.

3. The purification system of claim 1, wherein:
   an accumulator tank is located between the first heat exchanger and the control valve such that the purified hydrogen permeate stream accumulates within the accumulator tank and the purified hydrogen stream is supplied from the accumulator tank to the PEM fuel cell system; and
   the control valve is also configured to control flow rate of the purified hydrogen stream.

4. The purification system of claim 1, wherein the combustor has an oxidation catalyst to facilitate the combustion of the retentate stream.

5. The purification system of claim 1 or claim 2 or claim 3 or claim 4 wherein the metal is palladium or the metal alloy contains palladium.

6. A method of purifying a hydrogen stream supplied from a storage tank mounted in a vehicle to produce a purified hydrogen stream for a PEM fuel cell system utilized within the vehicle for generating electricity, said method comprising:
   separating impurities contained in the hydrogen stream by permeating hydrogen from the hydrogen stream through a membrane separator utilizing a hydrogen transport membrane material containing a metal or metal alloy capable of selectively permeating hydrogen from the hydrogen stream at an elevated operational membrane temperature, thereby to produce a purified hydrogen permeate stream and a retentate stream comprising impurities contained in the hydrogen stream;
   forming the purified hydrogen stream from the purified hydrogen permeate stream and supplying the purified hydrogen stream to the PEM fuel cell system;
   regulating pressure of the hydrogen stream to a palladium alloy membrane operational pressure;
   combusting the retentate stream to produce a heated exhaust stream;
   exchanging heat from the purified hydrogen permeate stream and from the heated exhaust stream to the hydrogen stream to heat the hydrogen stream and therefore the hydrogen transport membrane material to the elevated membrane operational temperature; and
   controlling pressure of the purified hydrogen stream to a PEM fuel cell operational pressure prior to supplying the purified hydrogen stream thereto.

7. The method of claim 6, wherein the purified hydrogen stream is directly formed from the purified hydrogen permeate stream.

8. The method of claim 6, wherein:
   the purified hydrogen permeate stream is accumulated in an accumulator tank and the purified hydrogen stream is supplied from the accumulator tank to the PEM fuel cell system; and
   the flow rate of the purified hydrogen stream is also controlled.

9. The method of claim 6, wherein the combustion of the retentate stream is facilitated by an oxidation catalyst.

10. The method of claim 6 or claim 7 or claim 8 or claim 9 wherein the metal is palladium or the metal alloy contains palladium.

* * * * *